Patented Aug. 25, 1953

2,650,204

UNITED STATES PATENT OFFICE 2,650,204

PREPARATION OF CATALYSTS

Peter William Reynolds and Anthony Arthur Leonard Challis, Norton-on-Tees, England, assignors to Imperial Chemical Industries Limited, a corporation of Great Britain No Drawing. Application April 28, 1950, Serial No. 158,932. In Great Britain May 4, 1949

5 Claims. (Cl. 252—476)

This invention relates to the production of catalysts.

It has already been proposed to prepare metallic catalysts by the partial or complete extraction of an alkali-soluble metal together with a catalytically active metal by treatment with alkali. This process has the disadvantage that the catalyst so prepared is liable to be contaminated with an alkali metal derivative, the presence of which may adversely effect the chemical reaction in which the catalyst is being used, or it may lead to a deterioration in the activity of the catalyst.

According to the present invention, foraminate catalysts comprising one or more metals selected from copper, cobalt, nickel and iron, are prepared by treating an alloy of one or more of these metals with silicon and/or aluminum at a temperature in excess of 100° C., with a phenol, or a monohydric aliphatic alcohol containing not more than four carbon atoms, to extract a portion of the silicon and/or aluminum.

By the term "foraminate catalyst" as used in this specification is meant one comprising particles or pieces, for example granules prepared by crushing, of an alloy comprising the desired catalytically active metal or metals together with one or more other metals more readily soluble in or more readily removed as vapour by the action of an extracting agent than the desired catalytically active metal or metals, said alloy comprising at least one phase in which atoms of the desired catalytically active metal or metals and of the aforesaid more readily extracted metal or metals are on the same crystal lattice, and said particles or pieces having a robust core of alloy and an outer active layer having a skeletal structure resulting from the partial or complete removal by the extracting agent of the more readily extracted metal or metals from the aforesaid phase or phases in said outer layer. The particles or pieces may be prepared in various sizes, but are preferably ⅛″ to ¼″.

In preparing catalysts by the process of the present invention it is preferred to extract the aluminum and/or silicon by the use of a monohydric phenol, preferably containing not more than 8 carbon atoms. Phenol itself is very suitable for use in the extraction. It is also possible to use alcohols containing not more than 4 carbon atoms.

The extraction may be carried out with the alcohol or phenol in either the liquid or vapour phase. Under normal conditions of operation, i. e., working at atmospheric pressure, it is suitable to employ the phenol in the liquid phase and the alcohol in the vapour phase. The temperature at which the extraction is carried out should be in excess of 100° C. and preferably within the range of 180° to 300° C. It is found in the treatment of some alloys, for example copper-silicon, that the catalyst particles tend to agglomerate to form a coherent mass when the treatment is carried out at 250° C. or above, and that this mass remains catalytically active and does not cause an undue pressure drop in the reaction in which it is being employed.

The present invention may be used for the preparation of catalysts comprising one or more metals selected from nickel, cobalt, copper and iron. By the treatment of an alloy of silicon and one of these metals with an alcohol or phenol under the preferred conditions, a portion of the silicon can be removed, apparently as an alkyl or aryl silicate. Similarly by the treatment of an alloy containing one or more of the catalytically active metals together with aluminum, a portion of the aluminum can be removed, apparently as an aluminum alkoxide or aryloxide.

It is not necessary for the phenol or alcohol to be completely dried prior to use, but the water content should preferably not exceed that present in commercial samples of the phenol or alcohol.

In preparing these foraminate catalysts, not more than 70% by weight of the initial silicon and/or aluminum content should be extracted. If the extraction is allowed to proceed beyond this point, the granules tend to break down, giving rise to Raney-type catalysts.

Suitable alloys for the operation of the present invention are, for example, copper-aluminum alloys containing from 40 to 80% by weight of copper, copper-silicon alloys containing from 50 to 92% by weight of copper, cobalt-aluminum alloys containing from 15 to 55% by weight of cobalt, cobalt-silicon alloys containing 30 to 75% by weight of cobalt, nickel-aluminum alloys containing 30 to 65% by weight of nickel, nickel-silicon alloys containing 30 to 85% by weight of nickel, and iron-aluminum alloys containing 30 to 60% by weight of iron. The alloy from which the catalysts are prepared may be employed for example in the form of granules grading between ⅙″ and 1″, but more preferably granules grading between ⅛″ and ¼″ are employed.

In the preparation of foraminate catalysts from aluminum and/or silicon alloys by processes previously disclosed, it has been the custom to employ alkali as the extracting agent. This, under certain circumstances, gives rise to contamination of the activated catalyst by alkali metal compounds and these frequently exert a deleterious effect upon the catalyst activity, and also promote undesired side reactions. In contrast to this, the present invention provides a method for preparing alkali-free catalysts. These may be used in processes of hydrogenation, dehydrogenation. hydrogenolysis and reductive amination.

The foraminate catalysts prepared by the present invention may be reactivated by a further treatment with a phenol or alcohol and this reactivation may frequently be carried out without removing the catalyst from the converter.

The total aluminum and/or silicon removal must not exceed 70% by weight of the initial content.

It is a further feature of the invention that when a phenol or alcohol is used as a starting material, or admixed with the starting material, or produced in the process, the catalyst reactivation will occur progressively.

Example 1

100 mls. of a copper-silicon alloy containing 85% by weight of copper and 15% by weight of silicon were placed in a vertical tube heated to 200° C. by an external electric winding. A layer of silica chips was placed on the top of the bed of alloy and liquid methanol was introduced at the top of the tube at a rate of 100 mls. per hour. The methanol was vaporised and passed downwards over the alloy. The extraction was continued until 280 mls. of liquid methanol had been introduced into the tube. By this time, 15.9 litres of hydrogen had been evolved, as a result of the reaction between methanol and the silicon. This corresponds to a 19% by weight removal of the initial silicon content.

6 mls. of the catalyst were charged to a converter and used for the hydrogenation of nitro-benzene to aniline. The reaction was carried out at a temperature of 300° C., using a nitro-benzene feed rate of 11 mls. of liquid per hour and a hydrogen rate of 40 litres per hour. Under these conditions 20% of the nitro-benzene was converted to aniline.

Example 2

35 mls. of the copper-silicon alloy employed in Example 1 were boiled with phenol until 5.14 litres of hydrogen had been evolved. This corresponds to the removal of 18% of the initial silicon content. The activated alloy was separated, washed with distilled water and 6 mls. were charged to a converter. Nitro-benzene was hydrogenated under the conditions described in the previous example. It was found that 60% of the nitro-benzene was converted to aniline.

Example 3

10 mls. of a nickel-silicon alloy containing 50% by weight of nickel and 50% by weight of silicon were activated by treatment for 1 hour with methanol under the conditions described in Example 1. The activated catalyst showed the removal of 8% of the initial silicon content.

Example 4

25 grams of a copper-aluminum alloy containing 55% by weight of copper were refluxed for 16 hours with 250 mls. of phenol. At the end of this time, the activated catalyst showed the removal of 9% of the initial aluminium content.

We claim:

1. A process for the preparation of a foraminate catalyst comprising at least one catalytic metal selected from the group consisting of copper, cobalt, nickel and iron which comprises treating an alloy selected from the group consisting of copper-aluminum containing from 40 to 80% by weight of copper, copper-silicon containing from 50 to 92% by weight of copper, cobalt-aluminum containing from 15 to 55% by weight of cobalt, cobalt-silicon containing from 30 to 75% by weight of cobalt, nickel-aluminum containing from 30 to 65% by weight of nickel, nickel-silicon containing from 30 to 85% by weight of nickel, and iron-aluminum containing from 30 to 60% by weight of iron at a temperature of from at least 100° to 300° C. with an organic hydroxyl compound selected from the group consisting of monohydric aliphatic alcohols containing at most four carbon atoms and phenols for a time sufficient to extract a substantial portion of and not more than 70% of the extractible element.

2. A process as set forth in claim 1 wherein the extraction is carried out at a temperature of 180° to 300° C.

3. A process for the preparation of a foraminate catalyst which comprises treating at a temperature of from at least 100° C. to 300° C. an alloy of copper and silicon containing from 50 to 92% by weight of copper in the liquid phase with phenol maintained at its boiling point for a time sufficient to extract a substantial portion of and not more than 70% of the silicon.

4. A process for the preparation of a foraminate catalyst comprising at least one catalytic metal selected from the group consisting of copper, cobalt, nickel and iron which comprises treating an alloy selected from the group consisting of copper-aluminum containing from 40 to 80% by weight of copper, copper-silicon containing from 50 to 92% by weight of copper, cobalt-aluminum containing from 15 to 55% by weight of cobalt, cobalt-silicon containing from 30 to 75% by weight of cobalt, nickel-aluminum containing from 30 to 65% by weight of nickel, nickel-silicon containing from 30 to 85% by weight of nickel and iron-aluminum containing from 30 to 60% by weight of iron in the liquid phase at a temperature of from at least 100° to 300° C. with a monohydric phenol containing at most eight carbon atoms for a time sufficient to extract a substantial portion of and not more than 70% of the extractible element.

5. A process for the preparation of a foraminate catalyst comprising at least one catalytic metal selected from the group consisting of copper, cobalt, nickel and iron which comprises treating an alloy selected from the group consisting of copper-aluminum containing from 40 to 80% by weight of copper, copper-silicon containing from 50 to 92% by weight of copper, cobalt-aluminum containing from 15 to 55% by weight of cobalt, cobalt-silicon containing from 30 to 75% by weight of cobalt, nickel-aluminum containing from 30 to 65% by weight of nickel, nickel silicon containing from 30 to 85% by weight of nickel and iron-aluminum containing from 30 to 60% by weight of iron in the vapor phase at a temperature of from at least 100° to 300° C. with a monohydric aliphatic alcohol containing at most four carbon atoms for a time sufficient to extract a substantial portion of and not more than 70% of the extractible element.

PETER WILLIAM REYNOLDS.
ANTHONY ARTHUR LEONARD CHALLIS.

References Cited in the file of this patent

UNITED STATES PATENTS

| Number | Name | Date |
|---|---|---|
| 1,937,489 | Jenness | Nov. 28, 1933 |
| 2,388,959 | Drew | Nov. 13, 1945 |

FOREIGN PATENTS

| Number | Country | Date |
|---|---|---|
| 282,112 | Great Britain | Dec. 13, 1926 |